United States Patent
Daswick

[11] 3,971,305
[45] July 27, 1976

[54] DISPOSABLE BEVERAGE BREWER

[76] Inventor: Alexander C. Daswick, 647 Orange Grove No. 209, South Pasadena, Calif. 91030

[22] Filed: Mar. 27, 1975

[21] Appl. No.: 562,707

[52] U.S. Cl. .................................. 99/295; 99/321; 426/77; 426/82
[51] Int. Cl.² ...................... A47J 31/06; A47J 31/02
[58] Field of Search ............ 99/306, 300, 304, 320, 99/321–322, 323, 450, 295, 317; 122/431; 202/200; 210/314, 474, 475, 476; 426/77, 84, 432–433, 434

[56] References Cited
UNITED STATES PATENTS

| | | | |
|---|---|---|---|
| 445,224 | 1/1891 | Knight | 210/476 |
| 1,015,946 | 1/1912 | Ebner | 210/474 |
| 1,612,450 | 12/1926 | Leichtfuss | 210/474 X |
| 2,084,839 | 6/1937 | Dubois | 99/304 UX |
| 2,835,191 | 5/1958 | Clurman | 99/322 |

*Primary Examiner*—Stanley N. Gilreath
*Assistant Examiner*—Arthur O. Henderson

[57] ABSTRACT

A disposable one cup coffee brewer comprises a conical paper brewing filter having contained in the bottom thereof a quantity of loose coffee grounds, and having movably disposed therewithin, above the coffee grounds, a disc-shaped primary buoyant element for diverting water poured into the filter from falling directly upon the coffee grounds. Secondly, buoyant water flow diverting elements, disposed ouwardly from such primary buoyant element, may be provided to cover more of the water surface as the filter is filled. The filter and its contents are supported within a rigid conical support, at least portions of which are spaced outwardly from the filter to allow flow of brewed beverage therefrom. Two foldable tabs attached to the support have portions which rest upon the rim of a coffee mug or the like. A method for brewing coffee or the like is thereby provided.

17 Claims, 7 Drawing Figures

DISPOSABLE BEVERAGE BREWER

BACKGROUND OF THE INVENTION

1. Field of the Invention

The present invention relates to beverage brewers for brewing beverages, and more particularly to disposable beverage brewers for brewing individual servings.

2. Description of the Prior Art

Numerous apparatus and methods for brewing beverages, such as coffee, are available. Many of these are, however, not readily adapted for preparing individual servings of beverages, such as may be desired for home, restaurant or institutional use, to obtain a single cup of fresh beverage. Although individual servings may be made from such materials as "instant" coffee, many consider beverages made in this manner to be inferior to beverages made from, for example, fresh coffee grounds.

Some apparatus have been constructed to brew small quantities of coffee from coffee grounds. These usually provide for pouring hot water through a container or cartridge of packed coffee grounds and directly upon the grounds. A refillable container is provided with several of these apparatus (for example, U.S. Pat. Nos. 1,456,010 and 3,215,060), and hence the user must measure a quantity of grounds into the container before using. Also the container and other parts must be cleaned after each use. Other apparatus (for example, U.S. Pat. Nos. 2,822,273; 2,899,310; 2,936,695; 3,083,101; 3,446,624; and 3,811,373) employ disposable cartridges or containers which are supplied with a pre-packaged quantity of coffee grounds. In most of these some portions of the apparatus are non-disposable; however, the entire apparatus of U.S. Pat. No. 2,822,273 is disposable. Still another apparatus, that of U.S. Pat. No. 3,767,420, utilizes a disposable "tea bag" like container in which the coffee grounds (or other material) is pre-packaged, and which is immersed in hot water to prepare the beverage.

SUMMARY OF THE INVENTION

In carrying out principles of the invention, a beverage brewer for coffee or the like comprises a disposable liquid permeable brewing filter, open at the top and closed at the bottom, and having contained therein a quantity of loose coffee grounds or other material from which a beverage may be brewed, and having movably retained therein a buoyant liquid diverting element which initially covers substantially all of the coffee grounds or the like, diverting liquid poured into the filter from being poured directly thereonto. A porous retaining means retains the water diverting element within the filter, allowing it to float at whatever level of liquid is in the filter, and also retains the coffee grounds or the like in the filter. A filter support is provided for maintaining the filter and its contents above a liquid receiving container, such as a coffee mug, during the brewing process.

More particularly, the filter comprises a cone of filter paper, and the filter support, which is also disposable, comprises another cone, within which the filter is disposed and which is constructed of waterproof, heavy paper or light cardboard, and which has portions spaced outwardly from the filter to allow a flow of brewed beverage therefrom. The retaining means comprises a cone shaped flexible fabric, attached to an outer edge portion to the inside of the filter and at a central region to the water diverting element. Additional and secondary buoyant water diverting elements may be attached to the retaining means between such central and outer edge portions. All portions of the beverage brewer are constructed of inexpensive material, whereby the brewer may be discarded after a single use.

In one variation the supporting cone is open at the bottom the brewing time being determined solely by the permeability of the filter paper. In another variation, the otherwise open bottom of the supporting cone is closed with a removable cap having a small aperture which restricts the flow of brewed beverage from the filter and allows a longer brewing time when the cap is in place.

The supporting cone, and the filter, are supported over the coffee mug or the like by two tabs attached to the supporting cone. Lower portions of the tabs fold upwardly to lie flush with the cone for stacking purposes and fold downwardly and outwardly to engage the mug. Portions of the tabs project downwardly into the mug, while other portions rest upon the rim thereof.

DESCRIPTION OF THE PREFERRED EMBODIMENT

Figures 1, 2, 3:
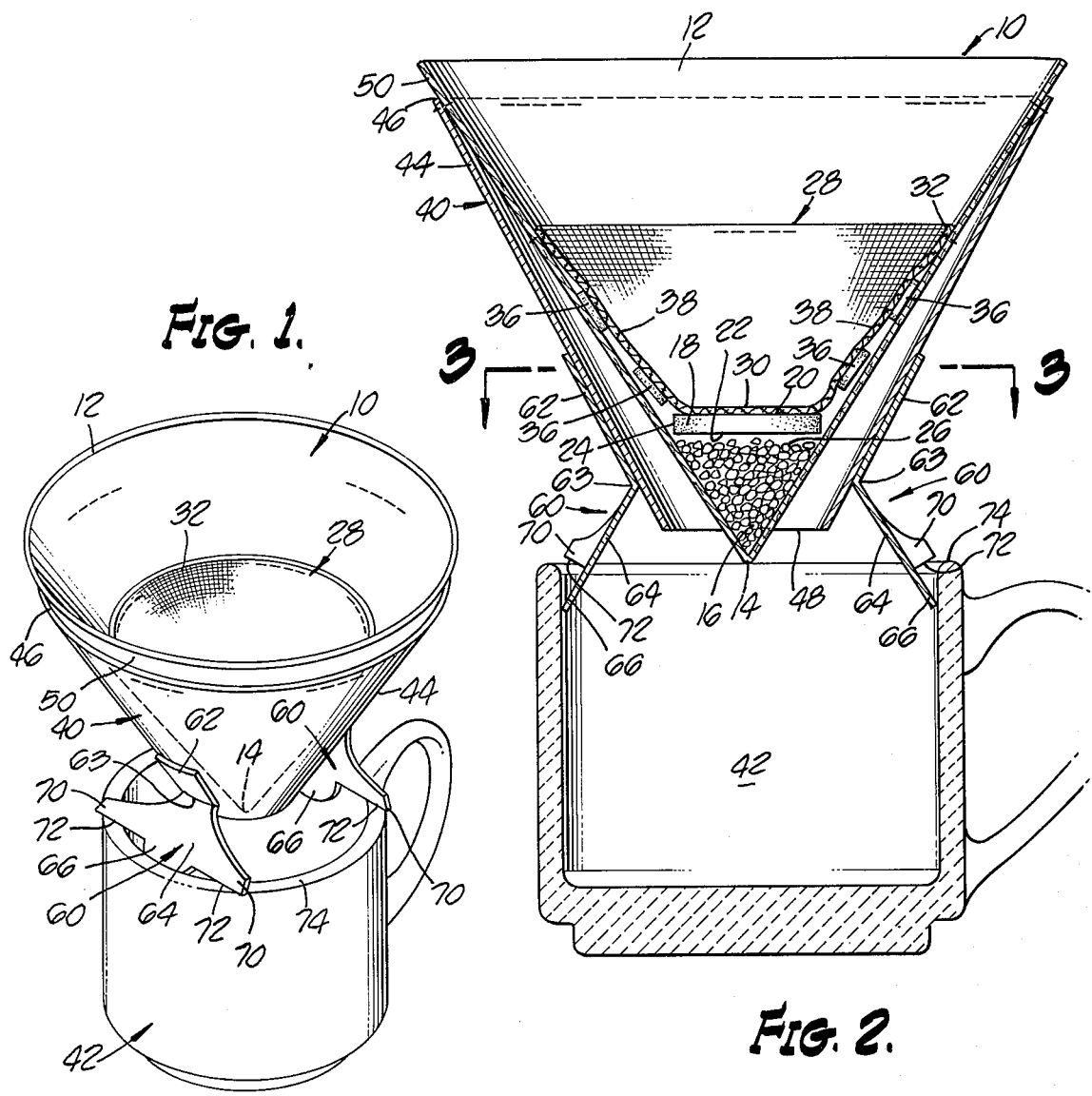
FIG. 1 is a perspective view of the coffee brewer positioned above a coffee mug.
FIG. 2 is a vertical sectional view of the coffee brewer positioned above a coffee mug.
FIG. 3 is a horizontal sectional view along line 3—3 of FIG. 2, showing the interior of the filter.

As best seen in FIGS. 1 and 2, a brewing element comprises a disposable conical filter 10, having a comparatively large open upper surface surrounded by an upper edge 12, and tapering to a bottom point 14. The filter 10 is constructed of a water permeable material, preferably filter paper which has substantial wet strength, and which is comparatively inexpensive so that it may be thrown away after a single use. Such material is required to have a porosity that will retain hot water in the filter 10 a sufficient time to brew a beverage from a quantity of coffee grounds (or the like) 16, which is contained loosely in the bottom of the filter, and is pre-packaged with the filter. Thus, for brewing coffee, the filter must retain hot water for approximately 2 to 3 minutes. The quantity of coffee grounds 16 depends upon the size of the filter 10, and may be one to two teaspoons full for each cup of filter capacity.

Movably disposed within the filter 10, above the coffee grounds 16, is a primary water diverting element 18 (FIGS. 2, 6 and 7), which comprises a thin disc, having an upper surface 20, a lower surface 22 and on edge 24, and having a diameter approximately equal to the cross-sectional diameter of the filter at an upper surface 26 of the coffee grounds. The element 18 is constructed of a non-porous, buoyant material, such as Styrofoam, which will float upon water.

A retaining mesh or web 28, constructed of an inexpensive loosely woven flexible material such as cheesecloth, is attached, at a central region 30 thereof, to the upper element surface 20. An outer edge portion 32 of the web 28 is attached, as by sewn stitches, to the inside surface of the filter 10, at or above the mid height thereof. The web 28 is constructed having a conical shape with substantially the same angle of taper as that of the filter 10, so that, upon assembly and with the filter 10 vertical the element 18 hangs initially at or near the upper surface 26 of the coffee grounds 16. A dual function is performed by the web 28: it retains the coffee grounds 16 within the filter 10 (the mesh size being sufficiently small for this purpose), and it retains the element 18 within the filter, allowing it to float at whatever level of water is contained in the filter.

Figure 6:
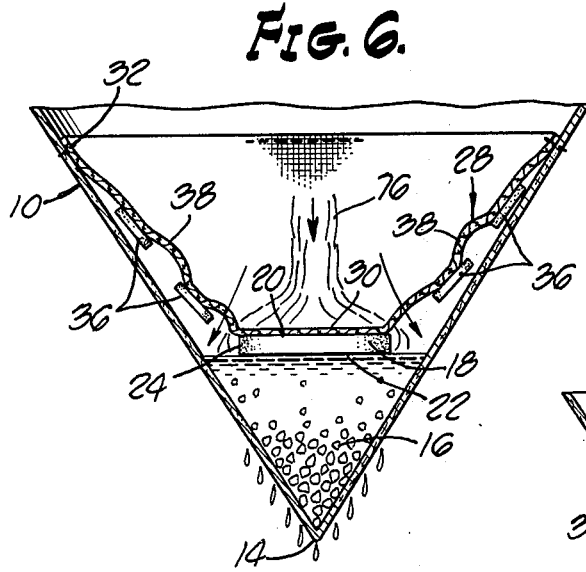
FIG. 6 is a vertical sectional view of the filter as water is added thereto.
Figure 7:
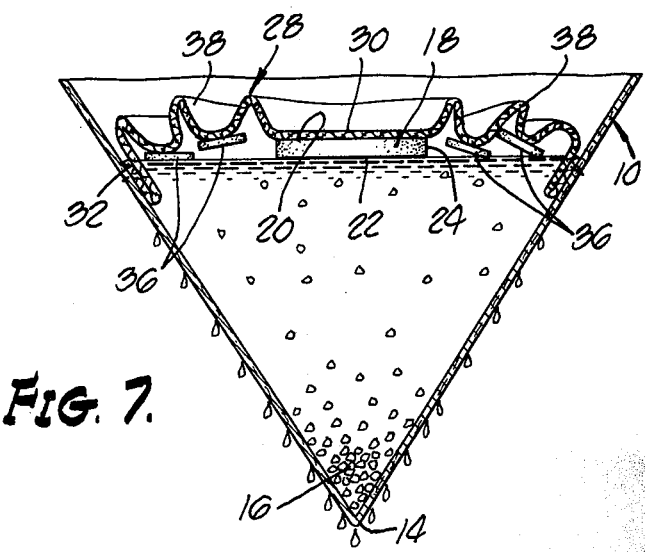
FIG. 7 is a vertical sectional view of the filter filled to the appropriate level for brewing coffee.

Maintained thus in a floating position by the web 28, the element 18 performs the important function of diverting hot water poured into the filter 10 and prevent it from falling directly upon the coffee grounds 16, as happens in many types of coffee makers utilizing a porous filter element. Such direct pouring of hot water upon the coffee grounds tends to extract the bitter acids from the grounds and also may tend to pack the coffee grounds into the bottom of the filter in such a manner to cause inefficient brewing, or plugging of the filter. For each water diverting purposes, a number of small, thin buoyant secondary elements 36, also made of a material such as Styrofoam, may be attached to the under side of the web 28, in spaced relationship, in an intermediate region 38 between the element 18 and the edge portion 32. (FIGS. 2, 6 and 7). As water is poured into the filter, such elements 38 float between the edge 24 of the element 18 and the adjacent sides of the filter 10 (FIG. 7) and provide additional covering for the coffee grounds.

Additionally, the element 18 protects the central web region 30 from being punctured or damaged by the point 14 of an adjacent filter 10 when the filters are stacked together for storing, such as may be desirable.

Still another function of the element 18, as well as of the elements 36, is to hide the coffee grounds 16 from the user's sight during the brewing operation, thus making the use of the apparatus esthetically more pleasing.

A support 40 is provided to position the filter 10, and its contents, above a liquid receiving container, for example, a coffee mug 42, during the brewing procedure. As best seen in FIGS. 1 and 2, the support 40 comprises a frusto-conical member 44 having an upper edge 46 around an open upper end and a lower edge 48 around an open lower end, and is preferably constructed of a waterproof heavy paper or light cardboard, which is inexpensive, so that the member is disposable. The filter 10 fits downwardly into the member 44, which has a conical angle less than that of the filter, such that an upper portion 50 of the filter 10, above the maximum water level, rests against the edge 46, and is circumferentially attached thereto, as by sewn stitches. (The attachment of the web 30 to the filter 10 and of the filter to the member 44 may be at common points for convenience in construction).

Because of the lesser conical angle of the member 44, lower portions of the member and the filter 10 are spaced apart so that the brewed coffee may flow from the filter freely down the outsides thereof to the point 14 (which may project below the member lower edge 48).

Alternatively, the member 44 may have the same tapered angle as the filter 10, but have portions thereof spaced outwardly from the filter to allow brewed coffee to flow freely down the outside of the filter. Such spacing may be provided, for example, by fluting either the filter 10 or the member 44, or by attaching spacer elements to the inside of the member 44 or to the outside of the filter 10.

Figure 4:
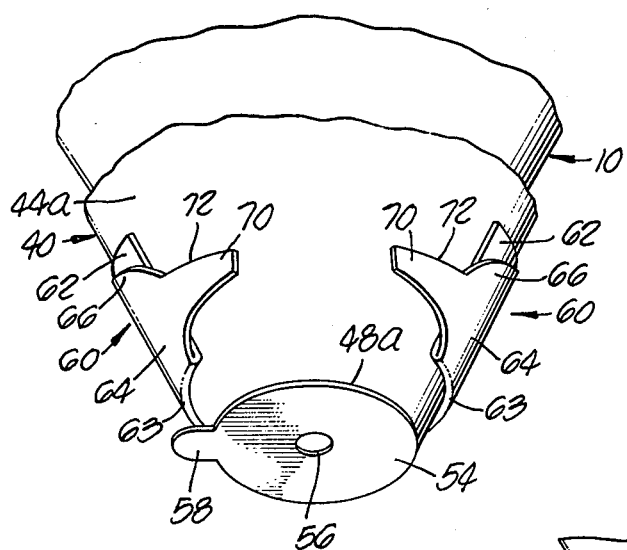
FIG. 4 is a perspective view showing the bottom of the support member covered.

In such arrangement, with the bottom of the member 44 open, the brewing time is dependent only upon the porosity of the filter 10. However, in a first variation of the support 40, as shown in FIG. 4, the lower end of a member 44a is closed with a removable disc or cap 54 which is attached to the lower member edge 48a. At least one small aperture 56 is provided in the cap 54, the size of such aperture being such as to restrict the flow of brewed coffee from the filter 10 and thereby increase the brewing time. That is, with the cap 54 in place, portions of the region between the filter 10 and the member 44a are filled with brewed coffee. By means of a tab 58, attached thereto, the cap 54 may be pulled free from the member 44a. In this manner, two different brewing times may be provided. The scope of the invention also includes use of a plurality of small apertures (not shown) in a closing disc such as the cap 54, and means, such as a removable tape, whereby the apertures may be individually uncovered, thereby providing a greater variety of brewing times.

Figure 5:
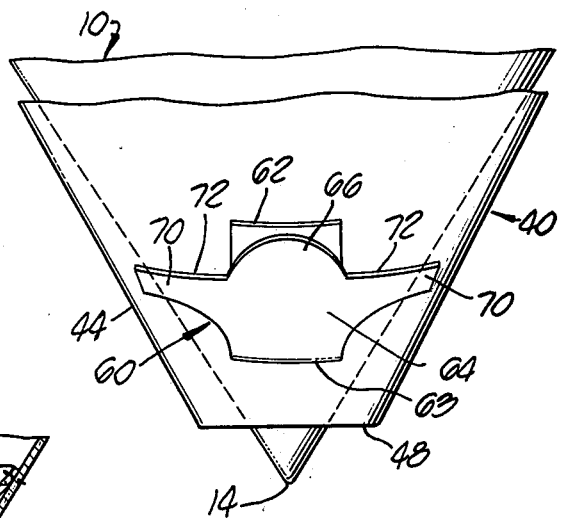
FIG. 5 is a side elevational view showing the support tabs folded for stacking.

Two support tabs 60 (although more than two may be used) are provided for supporting the member 44, and the filter 10, above the mug 42 (FIGS. 1, 2 and 3). Upper portions 62 of the tabs 60 are attached to lower regions of the member 44 in a symmetrical manner, as by gluing. Lower portions 64 of the tabs 60 are bendable, about bend lines 63, from a stacking position in which they lie along the surface of the member 44 being curved to the contour of such support for this purpose, substantially covering the upper portions 62 (FIG. 5), to outwardly and downwardly projecting positions for supporting the coffee brewer upon the mug 42. Each lower tab portion 64 comprises a central, projecting arcuate portion 66, end portions of which are adapted to be positioned inside the mug 42, and, to each side of the portions 66, a sideways projecting portion 70 having a lower edge 72 adapted to rest upon a rim 74 of the mug. Thus, with the two tabs 60, the coffee maker is supported at four points upon the rim 74, and is therefore stably maintained in position during the brewing operation.

OPERATION

Assume the coffee brewer has been assembled in the manner described and illustrated, and is supported above the mug 42 by the tabs 60. As seen in FIG. 6, hot water 76 is poured into the filter 10 where it falls onto the upper surface 20 of the element 18, which initially covers the coffee grounds 16. The element 18 diverts the flow of water towards the sides of the filter 10, the water flowing off the upper surface 20 and down the edge 24 onto only those coffee grounds which are at or near the sides of the filter. This flow of water down the sides of the filter tends to cause an upwelling of the coffee grounds along the axis of the filter, rather than cause packing of the grounds into the bottom of the filter.

As the water level in the filter 10 rises, the element 18 floats upon the water surface and continues to divert, sideways, water poured onto the element. When the element 18 floats upwardly, (as do the coffee grounds 16 initially) the cone of the web 28 becomes flattened and the secondary elements 36 are brought into contact with the surface of the water, upon which they also float (FIG. 7). These elements 36 also divert, to the side, water poured upon them, and thus also prevent the hot water from being poured directly upon most of the coffee grounds. In this manner, coffee, having a minimum of acid and utilizing all of the grounds, is brewed.

The coffee brewed in the filter 10 seeps through the filter, runs down the outside thereof and into the mug 42.

It is emphasized that all of the water required to brew the coffee may be poured into the filter at one pouring. It is unnecessary that a portion of the water be poured and a period of time waited before the remaining water is poured, as is necessary in some types of available coffee makers employing a filter element. The brewing time is thus relatively independent of the rate at which water is poured into the filter.

It is also emphasized that after the coffee has been brewed and has drained from the filter 10 into the mug 42, the entire coffee brewer is removed from the mug and discarded, another coffee brewer being used for the next cup of coffee. The necessity for cleaning portions of the coffee brewer, and for measuring quantities of coffee into portions thereof, is thereby eliminated.

A method of brewing coffee (or the like), by pouring hot water into a filter containing a pre-selected quantity of coffee grounds (or other material), and protecting the grounds from a direct flow of hot water by buoyant elements floatably retained within the filter, is thus provided.

When the coffee brewer shown and described is adapted for preparing an individual serving of coffee, the filter 10 may be approximately 4 ½ inches (11.4 cm.) high and have an open upper surface approximately 5 inches (12.7 cm.) in diameter. The element 18 may be approximately 1 ¾ inches (4.4 cm.) in diameter. The scope of the invention, however, encompasses larger versions of the apparatus adapted for making more than one cup of coffee at a time. In addition, the scope of the invention includes use of a non-disposable support 40, to which the filter 10 is removably attached (for example, by use of tape); although, some of the advantages of the apparatus may thereby be diminished.

It is also to be appreciated that materials other than coffee grounds may be pre-packaged in the filter 10; for example, tea leaves may be used. Thus, the foregoing description is to be clearly understood as given by way of illustration and example only, the spirit and the scope of the invention being limited solely by the appended claims.

What is claimed is:

1. A beverage brewer, which comprises:
    a. a disposable brewing element having an open top and a closed bottom, and having contained in a lower region thereof a pre-selected quantity of coffee grounds or the like,
    said brewing element being adapted to receive a supply of liquid and being liquid permeable,
    b. a liquid diverting element disposed within said brewing element above said coffee grounds or the like,
    said diverting element being buoyant and substantially non-porous, and substantially covering said coffee grounds or the like in its lowest position, whereby to divert liquid poured into said brewing element from being poured directly onto said coffee grounds, and
    c. means disposed within said brewing element above said coffee grounds or the like for movably retaining said diverting element generally within said brewing element,
    said retaining means allowing said diverting element to float at substantially any level of liquid within said brewing element, and retaining means also retaining said coffee grounds or the like within said brewing element and allowing a flow of liquid thereto.

2. The invention as claimed in claim 1, including means adapted for supporting said brewing element above a liquid receiving container.

3. The invention as claimed in claim 1, wherein said diverting element is substantially opaque, whereby at least a portion of said coffee grounds or the like are obscured from a user's view.

4. The invention as claimed in claim 1, wherein said brewing element is conical in shape, tapering downwardly to a point.

5. The invention as claimed in claim 1, wherein said brewing element, said diverting element and said retaining means are constructed of disposable material, whereby the beverage brewer may be discarded after a single use.

6. The invention as claimed in claim 1, wherein said brewing element is adapted to be used for an individual serving of beverage.

7. The invention as claimed in claim 1, wherein said retaining means comprises a flexible web of porous material having an outer region attached to an inner surface of said brewing element and having an inner region attached to said diverting element, said web being substantially larger than the cross-section of said filter element at the region of attachment thereto.

8. A disposable beverage brewer, which comprises:
    a. a filter having disposed in a lower portion thereof a pre-selected quantity of coffee grounds or the like,
    said filter being generally conical in shape and having a large diameter, open upper surface and a pointed bottom, said filter being adapted to receive a supply of water and being constructed of water permeable filter paper,
    b. a water diverting element disposed within said filter above said coffee grounds or the like,
    said diverting element being disc shaped and having a diameter substantially equal to that of the cross-section of said filter above the top of said coffee grounds or the like, said diverting element being adapted to float in water and being substantially non-porous, whereby water poured into said filter is substantially diverted from being poured directly upon said coffee grounds or the like,
    c. means for retaining said diverting element and said coffee grounds or the like within said filter,
    said means allowing said diverting element to float at substantially any level of water in said filter, and
    d. means for supporting said filter above a liquid receiving container, said supporting means comprising a substantially rigid element having a frusto-conical shape, being open at the top and bottom, and having an upper region attached to an upper region of said filter, portions of said rigid element being spaced outwardly from portions of said filter, whereby to allow a flow of brewed beverage therebetween.

9. The invention as claimed in claim 8, wherein said retaining means comprises a flexible, conical web of porous material, having an outer edge portion attached to said filter, and having a central region attached to said diverting element, the angle of taper of said web being substantially equal to that of said filter.

10. The invention as claimed in claim 9, including a plurality of small buoyant, secondary water diverting elements, said secondary elements being attached to said web between said outer and central regions thereof.

11. The invention as claimed in claim 8, wherein said supporting means includes a plurality of support tabs, said support tabs being attached to lower portions of said rigid element, said tabs being bendable, from a position along sides of said rigid element for stacking purposes, to project outwardly and downwardly, lower portions of said tabs having a first projecting portion adapted to project downwardly into a liquid receiving container and second sideways projecting portions having lower edges adapted to rest upon upper surfaces of said liquid receiving container, whereby to support said rigid element.

12. The invention as claimed in claim 8, wherein said rigid element includes a cap closing the lower end thereof, said cap having at least one small aperture adapted for the flow of a brewed beverage therethrough from said filter whereby said flow is restricted and the brewing time is increased over that without said cap.

13. The invention as claimed in claim 12, wherein said cap is removable from said lower end, whereby an opening larger than that of said aperture may be provided to shorten the brewing time of the beverage being brewed.

14. The invention as claimed in claim 8, wherein said rigid element has an angle of taper less than that of said filter, whereby lower portions of said rigid element are spaced outwardly from said filter.

15. The invention as claimed in claim 8, wherein said rigid element has substantially the same angle of taper as said filter, said rigid element including means for spacing portions of said rigid element outwardly from portions of said filter.

16. The invention as claimed in claim 8, wherein said filter is attached along an upper edge portion circumferentially around an upper portion of said rigid element.

17. A disposable food package for brewing a liquid food product, comprising a conical holder having an opening at the bottom, supporting fingers attached to the outer surface of the holder and movable into positions for engaging the top rim of a cup or mug for supporting the holder thereon, a conical filter positioned inside the holder, the filter being permanently secured to the holder, a charge of particulate food material positioned within the bottom portion of the filter, a float member resting above the charge of food material and acting as a removable cover for same, and means securing the float member to the inner wall of the filter and permitting same to float upward to the top of the filter but not to be entirely removed from it.

* * * * *